United States Patent [19]

Meier

[11] Patent Number: 4,916,324

[45] Date of Patent: Apr. 10, 1990

[54] METHOD AND APPARATUS FOR ELECTRO-OPTICAL DISTANCE MEASUREMENT

[75] Inventor: Dietrich Meier, Niedererlinsbach, Switzerland

[73] Assignee: Kern & Co. AG, Aarau, Switzerland

[21] Appl. No.: 250,854

[22] Filed: Sep. 29, 1988

[30] Foreign Application Priority Data

Oct. 23, 1987 [CH] Switzerland .................. 4163/87

[51] Int. Cl.$^4$ ............................................. G01N 21/86
[52] U.S. Cl. ......................................... 250/561; 356/5
[58] Field of Search ................ 250/201 AF, 560, 561; 356/1, 4, 5, 141, 152

[56] References Cited

U.S. PATENT DOCUMENTS

| | | | |
|---|---|---|---|
| 3,200,698 | 8/1965 | Froome et al. | 356/5 |
| 3,424,531 | 1/1969 | Bender et al. | 356/4 |
| 4,759,623 | 7/1988 | Meier | 356/5 |

*Primary Examiner*—David C. Nelms
*Attorney, Agent, or Firm*—Burns, Doane, Swecker & Mathis

[57] ABSTRACT

To simplify the reflectors for electro-optical distance measurement with a distance measuring apparatus with modulation of light outside of the light source, the optical bundle for distance measurement is focussed on to the target. Thereby, distance measurements on unprepared (non-cooperative) objects or on objects prepared only with simple reflecting foils are made possible.

14 Claims, 1 Drawing Sheet

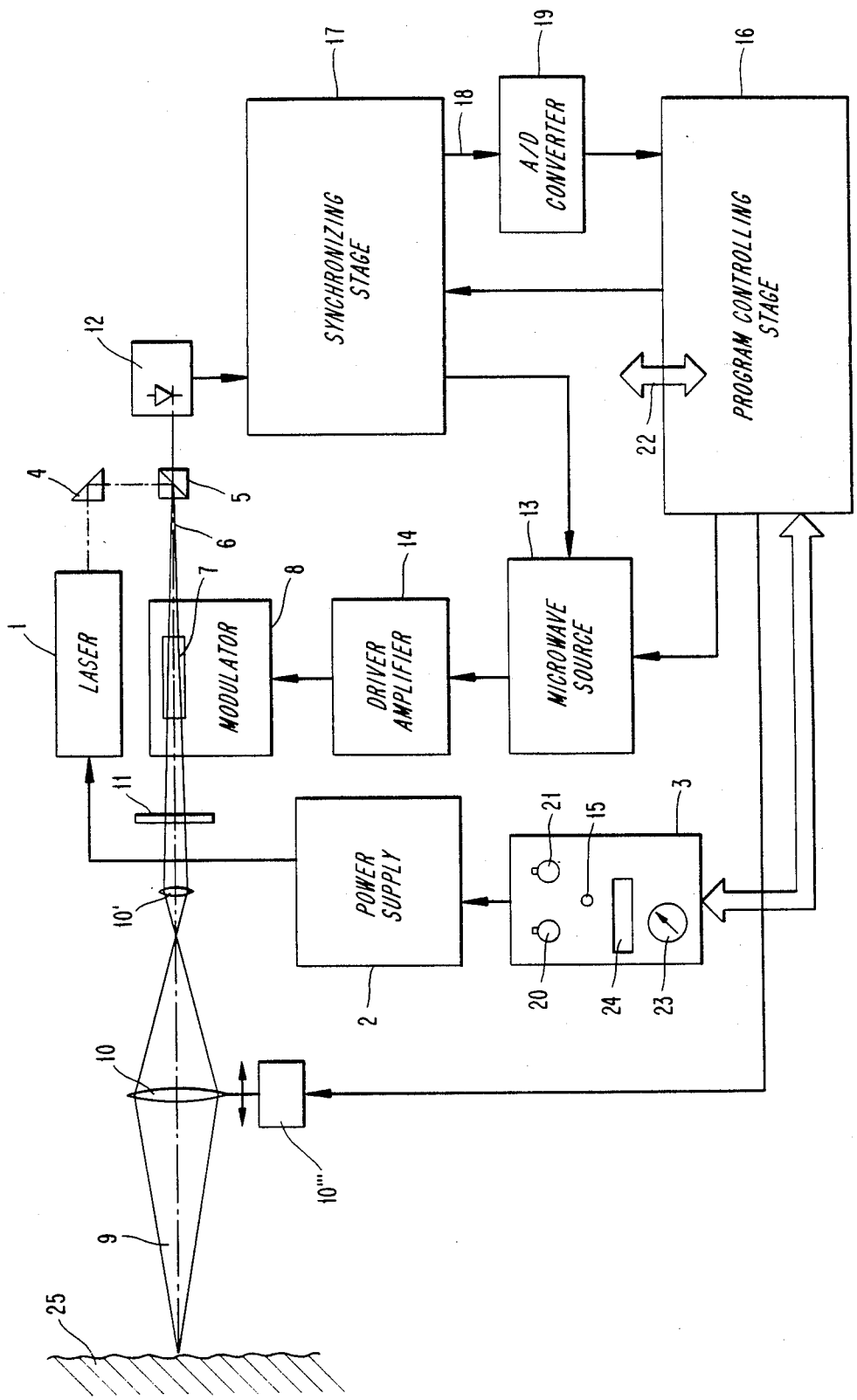

METHOD AND APPARATUS FOR ELECTRO-OPTICAL DISTANCE MEASUREMENT

BACKGROUND OF THE INVENTION

This invention relates to a method and apparatus for electro-optical distance measurement.

In the prior art, various types of electro-optical distance measuring apparatuses using the propagation velocity of light in space or in air are well known. Most broadly used are instruments with sinusoidal modulation of the brightness of a light beam. After having travelled twice the measured distance up to an optical reflector and back again, said modulation of the light beam undergoes a phase shift which is related to the distance and which is measured by optical and electric means. After recent progress in the development of electric time measurement techniques, the time of propagation of single light impulses or flashes also has been measured once or repetitively for determining distance.

Until now, less frequently used are instruments for distance measurement according to the so called tooth-wheel method (A.H.L. Fizeau, 1846). Originally, this method consisted of periodically interrupting a beam of light by means of a tooth wheel, transmitting the interrupted beam to a reflector and after retro-reflection periodically interrupting said beam a second time by the same tooth-wheel. Due to its retardation, the light beam, with a convenient number of revolutions per minute of the tooth-wheel, on its return will hit a tooth instead of a gap and be thus blocked from observation. With this method, the time of travel of the beam is calculated from the number of revolutions for the above mentioned case. According to the state of the art, electro-optical crystals are used instead of the tooth-wheel (see U.S. Pat. No. 3,424,531 to P. L. Bender et al.). Such crystals, instead of interruptions, produce a periodic modulation of elliptical polarization of the light beam. A linearly polarized beam with suitable orientation of its plane of polarization with respect to the axes of the electro-optic crystal is modulated with a sinusoidal electric signal of some 100 MHz. If retro-reflected beam components upon their second pass through the crystal in reverse direction meet the same phase of modulation as on their first pass, the original steady state linear polarization is restored and complete darkness of those beam components is observed behind a suitable optical analyzer. This is the case when at each moment the total number of modulation wavelengths present over twice the measured distance from the crystal to the retro-reflector and back is an integer number. If it is not, the brightness of the beam will not be minimum, but then a minimum may be obtained by changing the measured distance or the wavelength of modulation. Both methods are state of the art (see also GB Pat. No. 919,368 to K. D. Froome et al.).

Various known instruments for electro-optical distance measurement comprising electro-optic crystal modulators are made to cooperate with one or more corner-cube reflectors as target means. These corner-cubes retro-reflect an incident measuring beam essentailly on its original path back to the distance measuring instrument. The original path also includes the modulating crystal such that an almost complete demodulation is possible and the above mentioned minimum of brightness may be observed. The completeness of this retro-reflection depends on manufacturing precision of the corner-cube reflectors, which must be rather high and also must be maintained during the measurement procedure. Such reflectors consequently have a rather high price and are delicate and difficult to handle.

If one tries to aim a distance measuring instrument with an electro-optic crystal modulator of known type on to an arbitrary unprepared object or on a reflecting foil instead of a corner-cube reflector for measurement, none of the above mentioned brightness minima will occur and no measurement is possible, although sufficiently intensive radiation components are received from the targeted object.

SUMMARY OF THE INVENTION

One object of the present invention therefore, is to provide a method for electro-optical distance measurement, which employs a distance measuring apparatus comprising a modulating means according to the tooth-wheel method, said method allowing measurements on arbitrary unprepared objects or reflecting foils.

The present invention is directed toward satisfying this and other objects with a method which employs an apparatus, wherein a modulating means is provided for modulating a bundle of electromagnetic radiation on its path to the target and modulating it a second time on its way back from the target, and wherein the modulated bundle is focussed onto the target means. The above solution is based on the fact, that a broad spot of an unfocussed bundle on a target with a broad nondirectional scattering characteristic will produce rather strong scattered components, which undergo various new modulation effects as they pass new skew paths through the modulator crystal. Thus the uniform linear polarization necessary for a brightness minimum cannot be obtained. With a focussed bundle, on the other hand, a small right spot on the target is obtained in such a way that radiation components scattered away from their original path are simply lost for reception and cannot mask any brightness minimum to be detected by the measurement instrument.

BRIEF DESCRIPTION OF THE DRAWINGS

These objects and many other advantages of the present invention will be readily apparent to one skilled in the pertinent art from the following detailed description of the preferred embodiments thereof as described in conjunction with the drawings, wherein:

The FIGURE is a schematic representation of a preferred embodiment of an electro-optic distance measuring apparatus employed for carrying out the method according to the present invention.

DETAILED DESCRIPTION OF A PREFERRED EMBODIMENT

In the FIGURE, a Helium-Neon laser 1 is powered by a power supply 2, the latter being controlled by a service panel 3. The beam from the laser 1 is deviated by a deviating prism 4 to a polarizing beam splitter 5 where it is linearly polarized. Now, the linearly polarized beam 6 passes an electro-optic modulating crystal 7 being mounted within a line-resonator of a modulator 8. Thus, the laser beam having a modulated elliptic polarization is transmitted by a lens 10, 10' over the measured path with a typical length of from a few meters to a few kilometers.

The lens comprises two components 10, 10', of which component 10 may be shifted along the optical axis by a driver unit 10''' for focussing purposes. The laser beam 9 expanded by the lens 10, 10' is focussed on a target object 25 when measuring with the distance measuring apparatus. A focussing criterion is derived from the modulation of radiation components scattered at the target 25 and detected by a photoelectric receiver 12. A broad spot of an unfocussed bundle on a target 25 with a broad non-directional scattering characteristic will produce rather strong scattered components that undergo various new modulation effects as they pass new skew paths through the modulator crystal 7.

These components will mask any brightness minimum on the receiver 12, that can be obtained however with a focussed small bright spot on the target 25, as described more in detail below. Because with masked brightness minima the depth of modulation is very low, this depth of modulation is used as a focussing criterion. Some components of the modulated laser beam 9 scattered at the target 25 return to the modulating crystal 7 via the lens 10, 10'. Between the modulating crystal 7 and the lens 10 the outgoing and returning laser beam 9 passes a quarterwave plate 11 twice. Therefore if the modulator 8 would have no effect, the returning laser beam 6 would have its plane of polarization rotated by 90 degrees with respect to the outgoing beam. The former beam would thus pass the polarizing beam splitter 5 in a straight line and hit a photoelectric receiver 12.

The modulator crystal 7 is made of Lithium Niobate ($LiNbO_3$). It is driven by a modulating signal of a modulating frequency variably selectable from a given set of frequencies. The modulating signal is supplied by a microwave source 13 via a driver amplifier 14. If the periodic modulating signal has a frequency of e.g. 500 MHz, a modulation wave of length 60 cm is successively transmitted onto the measured path after each 2 nsec period of elapsed time. In case of a measured path with a double length of an integer multiple of 60 cm, the modulation phases of the outgoing beam and returning beam at the crystal 7 output to the measured path are equal at any moment. The returning beam is then completely demodulated by crystal 7 and emerges with a constant linear polarization again. Due to the quarterwave plate 11 the plane of polarization has been rotated by 90 degrees and the photoelectric receiver 12 gets a constant maximum of brightness.

The modulating effect of the $LiNbO_3$ crystal 78 is particularly sensitive to temperature changes. Therefore, modulation and demodulation is done by the same crystal 7 with the so called round trip mode. Effects of static birefringence of crystal 7 are compensated at each moment, because due to the quarterwave plate 11 the plane of polarization of the returning beam is rotated by 90 degrees with respect to the outgoing one. If the modulating frequency of microwave source 13 is varied, the ratio of the double length of the measure path to the modulation wavelength is no longer an integer, and the brightness sensed by the photoelectric receiver 12 shows a peculiar periodic change with maxima and rather pronounced minima.

During the course of measurement described more in detail below, after pressing a start button 15 on service panel 3, a sequence of rising or falling modulation frequencies is selected at the microwave source 13 by a control stage 16. Each one of the modulating signals with a selected frequency is frequency-modulated or wobbled with a 1 kHz wobble and a frequency shift of $+/-5$ kHz or $+-25$ kHz by a control signal from a synchronizing stage 17. for short distances, the above mentioned minima being less pronounced, the larger $+/-25$ kHz wobble is used for sampling the periodic change of the receiver 12 output. This output signal is sampled by two detection channels I and II with frequency difference of 10 kHz or 50 kHz under control of the synchronizing stage 17. By this process the modulation frequencies corresponding to successive signal minima are found by means of a program controlling stage 16. This program provides for mean frequency results, taking into account variations of the measured path due to atmospheric effects.

From the above frequency results, the length of the measured path is calculated by a microprocessor of control stage 16 as described below. If the double length of the measured path is an integer multiple of the modulation wavelength, the propagation time 2T of the beam 9 of laser 1 from modulator 7 to the reflector and back is an integer multiple gamma of the modulation period t=2 nsec, thus 2T=gamma t. However, the value of the integer gamma is still unknown. This uncertainty is eliminated in a way known as such, by determining the modulation frequencies or modulation periods t for two or more successive minima of the output signal of receiver 12. If a certain multiple gamma gives a minimum with a modulation period $t_{(gamma)}$ and the n-th following multiple (gamma+n) gives a minimum with a modulation period $t_{(gamms+n)}$, the propagation time is in each case $$2T = gamma\ t(gamma) = (gamma+n)\ t(gamma+n).$$

Therefrom the integer multiple $$gamma = n\ t(gamma+n)\ /\ (t(gamma - t(gamma+n)),$$

the time of propagation $T = (\frac{1}{2})$ gamma t and themeasured distance $L = c\ T$, where the velocity of light c depends in a known manner from pressure, temperature and humidity of the air present on the measured path. The number (gamma+n) of modulation periods $t_{(gamma+n)}$ that make up the propagation time 2T depends on the choice of the modulation period that may be $t_{(gamma)}$, $t_{(gamma+1)}$, $t_{(gamma+2)}$ and so on. If, e.g. the seventh minimum $t_{(gamma+7)}$ is chosen, n is equal to 7, and the integer multiple is given by The evaluation of the output signal of the photoelectric receiver 12 is done as already mentioned by means of the synchronizing stage 17 and the control stage 16. A synchronous detector of stage 17 in synchronism with the control signal for the frequency modulation of the microwave source 13 samples the output of receiver 12 at any moment when the wobbled modulation frequency for modulator 8 reaches its relative maxima (channel I) and minima (channel II). The synchronous detector holds the sampled values of channels I and II until the respective following values are sampled. By calculating the difference between channels I and II and the mean value of this difference with respect to time, an analog signal is obtained of which the sign indicates the deviation of the output of receiver 12 from a minimum.

This analog signal is fed via a line 18 to an analogdigital converter 19 converting it to a digital 8-bit signal which is then fed to the control stage 16. This control stage 16 is used for control of the frequencies of the microwave source 13 by means of a program, for calculating the characteristic modulation periods $t_{(gamma+n)}$ mentioned above, from the digital 8-bit signal from A/D-converter 19, for output of the measured distance, and for control of the frequency sweep +/−5 kHz or +/31 25 kHz via the synchronizing stage 17 and the microwave source 13.

On the service panel 3 there are further provided switches 20 and 21 for manual selection of modes of operation via the control stage 16. Switch 20 may be used for selecting, as mentioned above, the frequency sweep of +/31 5 kHz or +/−25 kHz for long distances or for smaller ones. Switch 21 has positions OFF, REMOTE, MEASURE, BATTERY-TEST. With switch 21 on position REMOTE, the measurement procedure and output of results may be controlled externally via an ASB (american standard code for information interchange single line bus) 22, with switch 21 on position BATTERY-TEST the voltage of a power supply battery is indicated at an instrument 23. With switch 21 on position MEASURE, the above mentioned deviation of the output signal of receiver 12 from a minimum is displayed at the instrument 23. A digital display 24 is used to indicate the measured distances.

Many embodiments may be realized with the above principles in mind without leaving the scope of the present invention. With a sufficient optical power of the radiation source 1, no particular preparation or means for enhancement of relfection are required on the target 25 for limited measurement distances. Good results have been obtained by providing in a manner known as such, a multitude of reflecting elements on the target. These elements may be small glass globules on a Scotchlite-reflecting foil. Such a foil has the important characteristic, that it maintains the state of polarization as it reflects an incoming beam.

If the distance measuring apparatus is combined with a theodolite to obtain a tacheometer, the theodolite telescope may be used for focussing instead of a separate focussing lens 10, 10′. In this case the ray-path for distance measurement is conveniently inserted into the telescope before passing the focussing lens. Interference effects between components of radiation scattered at the target and secondary reflections from the light source 1 appearing on the photoelectric receiver 12 may be used as a criterion for focussing because such interferences occur only in the focussed ray-path.

The photoelectric receiver 12 may be a sensitive element with small bandwidth of frequency response, e.g. a PIN-diode, a photoelectron multiplier or an avalanche photodiode. If the targets 25 which must be measured have a surface that changes the polarization of the measurement ray differently at different surfaces portions, the small focussed spot according to the present inention is advantageous, because the polarization of the beam components received again for measurement may only undergo a common change instead of many different changes which would make any brightness minimum undetectable.

It will be appreciated by those of ordinary skill in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A method for electro-optical distance measurement employing a distance measuring apparatus, comprising the steps of: generating a bundle of electromagnetic radiation; modulating said bundle a first time by means of an electro-optic modulator; focussing the bundle onto a target; modulating a second time components of said bundle reflected at said target means; and measuring the signal strength of said components.

2. A method as claimed in claim 1, wherein the target means is provided with a multitude of reflecting elements within the area receiving said bundle of electromagnetic radiation.

3. A method as claimed in claim 2, wherein said multitude of reflecting elements are provided on a reflecting foil.

4. A method as claimed in claim 1, wherein said electro-optic modulator comprises an electro-optic crystal, by means of which the polarization of said bundle of electromagnetic radiation is modulated.

5. A method as claimed in claim 4, wherein the bundle of electromagnetic radiation is coherent and is modulated for both the first time as well as for the second time by means of only one and the same electro-optic crystal.

6. A method as claimed in claim 5, wherein said coherent bundle of electromagnetic radiation is linearly polarized and is directed successively through a polarizing beam splitter, said electro-optic crystal, a quarterwave plate matched to a wavelength of electromagnetic radiation of said bundle, onto the target means and once more through said quarterwave plate, said electro-optic crystal and said polarizing beam splitter onto a detector of electromagnetic radiation.

7. A method as claimed in claim 6, wherein interference effects between components of radiation scattered at said target means and at said distance measuring apparatus appearing on said detector of electromagnetic radiation are used as a criterion of focussing said bundle of electromagnetic radiation onto said target means.

8. A method as claimed in claim 6, wherein said bundle of electromagnetic radiation is modulated with a varying frequency, and corresponding variations on said detector of components of radiation scattered at the target means are used as a criterion of focussing.

9. An electro-optical distance measuring apparatus comprising:
    means for generating a bundle of electromagnetic radiation;
    electro-optic modulator means for modulating said bundle a first time;
    means for focussing the modulated bundle onto a target; and
    means for measuring a signal strength of components of said bundle which have been reflected from said target and modulated a second time by said modulator means.

10. The apparatus according to claim 9, wherein said electro-optic modulator means further comprises an electro-optic crystal, by means of which the polarization of said bundle of electromagnetic radiation is modulated.

11. The apparatus according to claim 10, wherein the bundle of electromagnetic radiation is coherent and is modulated for both the first time as well as for the second time by means of only one and the same electro-optic crystal.

12. The apparatus according to claim 11, wherein said coherent bundle of electromagnetic radiation is linearly polarized and is directed successively through a polarizing beam splitter, said electro-optic crystal, a quarterwave plate matched to a wavelength of electromagnetic radiation of said bundle, onto the target means and once more through said quarterwave plate, said electro-optic crystal and said polarizing beam splitter onto a detector of electromagnetic radiation.

13. The apparatus according to claim 12, wherein interference effects between components of radiation scattered at said target and at said distance measuring apparatus appearing on said detector of electromagnetic radiation are used as a criterion of focussing said bundle of electromagnetic radiation onto said target.

14. The apparatus according to claim 12, wherein said bundle of electromagnetic radiation is modulated with a varying frequency, and corresponding variations on said detector of components of radiation scattered at the target are used as a criterion of focussing.

* * * * *